US 8,214,852 B2

(12) United States Patent
Makino (10) Patent No.: US 8,214,852 B2
(45) Date of Patent: Jul. 3, 2012

(54) DISC DEVICE INCLUDING DISC LOADING MECHANISM

(75) Inventor: Takeshi Makino, Echizen (JP)

(73) Assignee: Orion Electric Company, Ltd., Fukui-ken (JP)

( * ) Notice: Subject to any disclaimer, the term of this patent is extended or adjusted under 35 U.S.C. 154(b) by 0 days.

(21) Appl. No.: 13/064,225

(22) Filed: Mar. 11, 2011

(65) Prior Publication Data
US 2011/0225601 A1 Sep. 15, 2011

(30) Foreign Application Priority Data

Mar. 12, 2010 (JP) ................................ 2010-055656

(51) Int. Cl.
*G11B 17/04* (2006.01)
(52) U.S. Cl. ...................................... 720/604
(58) Field of Classification Search .................. 720/604
See application file for complete search history.

(56) References Cited

U.S. PATENT DOCUMENTS

| 7,437,744 B2 * | 10/2008 | Yang | 720/607 |
| 7,503,054 B2 * | 3/2009 | Fukasawa | 720/608 |
| 7,581,233 B2 * | 8/2009 | Ueno et al. | 720/690 |
| 7,617,505 B2 * | 11/2009 | Fukasawa | 720/608 |
| 7,831,984 B2 * | 11/2010 | Ueno et al. | 720/651 |
| 8,024,747 B2 * | 9/2011 | Narui et al. | 720/623 |
| 2008/0098413 A1 * | 4/2008 | Fukasawa | 720/604 |
| 2009/0138899 A1 * | 5/2009 | Wang et al. | 720/604 |

FOREIGN PATENT DOCUMENTS

| JP | 2003-077204 | 3/2003 |
| JP | 2003-077260 | 3/2003 |
| JP | 2003-217212 | 7/2003 |
| JP | 2004-355736 | 12/2004 |
| JP | 2006-018959 | 1/2006 |
| JP | 2008-097770 | 4/2008 |

* cited by examiner

*Primary Examiner* — Mark Blouin
(74) *Attorney, Agent, or Firm* — Stites & Harbison, PLLC; Juan Carlos A. Marquez, Esq (57) ABSTRACT

In a disc device including a disc loading mechanism for transporting a disc between an inside and an outside of the disc device, a frame acting as an exterior of the disc device is disposed with at least a motor as a power source, and a switch for controlling the rotation or the stop of the motor by switching on or off, and a pressing unit for switching on or off of the switch is disposed integrally with the frame. With the configuration, the rotation control of the motor as the power source is realized by a simple structure.

2 Claims, 13 Drawing Sheets

DISC DEVICE INCLUDING DISC LOADING MECHANISM

BACKGROUND OF THE INVENTION

1. Field of the Invention

The invention relates to a disc device for performing recording/playing-back using a disc such as Blu-ray Disc and Digital Versatile Disc (DVD) or Compact Disc (CD), and the like as a medium, and more particularly relates to a disc device including a disc loading mechanism for transporting a disc between an inside and an outside of the disc device.

2. Description of the Related Art

A disc loading mechanism is a mechanism for transporting a disc from an outside of a disc device to a predetermined position in the disc device. The disc loading mechanism includes, for example, a mechanism which has a tray capable of reciprocating between an outside and an inside of a disc device, places a disc on the tray, and transports the tray using a motor as a power source, a mechanism in which an insertion port is disposed via which a disc is directly inserted and extracted, a transport roller is disposed in the insertion port to transport a disc and which transports the disc using a motor as a power source likewise, and the like. The disc loading mechanism is provided with means for detecting a position of the tray or the disc and controlling the rotation of the motor as the power source.

Japanese Patent Application Laid-Open No. 2006-18959 describes a structure for detecting a position of a tray for transporting a disc placed thereon by a single switch. In the structure, a lever, which presses the switch attached to the disc device, is turnably disposed in the proximity of the switch in a pivotal state, an L-shaped piece is disposed to the leading end of a traverse unit which moves up and down and right and left by the transport operation of the tray, and further the tray is separately disposed a projection for pressing the lever.

According to the structure of Japanese Patent Application Laid-Open No. 2006-18959, when the tray is disposed inside of the disc device, the traverse unit moves to the switch side, the lever is turned about a pivot and presses the switch, when the tray is being transported, the switch is not pressed, and when the tray is disposed outside of the disc device, the lever can be pressed by the projection of the tray. As a result, the motor for transporting the tray can be controlled by the single switch, and further it is expected to improve the durability of the switch by pressing the switch from a press direction thereof. However, since it is necessary to provide the disc device with the lever as a component for pressing the switch, it is concerned that the cost of the disc device is increased by an increase of the number of components and the size of the disc device is increased by securing an installation space. Further, since it is necessary to dispose the L-shaped piece and the projection to the traverse unit and the tray, respectively to press the lever, it is considered that the shape of the components and the structure of the disc device become complex.

An object of the invention, which was made in view of the points described above, is to provide a disc device which realizes the control of a power source for transporting a disc by a single switch in a simple structure, can reduce the size of the disc device by aggregating relating components, and further includes a disc loading mechanism which can improve the durability of the switch.

SUMMARY OF THE INVENTION

A disc device including a disc loading mechanism according to a first aspect is characterized by including a frame acting as an exterior component, a power source for transporting a disc, a switch for controlling the start or the stop of the power source by switching on or off, a pressing unit for turning on and off the switch, a slidable slider, and a traverse unit which tilts in association with a slide operation of the slider, wherein the power source, the switch, the slider, and the traverse unit are disposed to the frame, the pressing unit is formed integrally with the frame, the slider is formed with a cam groove for moving the pressing unit, the pressing unit is formed with a pressing unit projection loosely fit into the cam groove, and the pressing unit can move in a direction where the pressing unit is pressed to and separated from the switch in association with the slide operation of the slider.

Further, the disc device including a disc loading mechanism according to a second aspect is characterized in that the switch is a push switch including an expansion/contraction portion which can move in an axis direction, and the pressing unit can move in the press direction of the expansion/contraction portion in the disc device including the disc loading mechanism according to the first aspect.

According to the configuration of the invention, since a dedicated component, which is conventionally required to press a switch can be deleted by forming the pressing unit for pressing the switch for controlling the rotation of the motor as the power source integrally with the frame, a less expensive disc device can be provided.

Further, since the relatively aggregated disc loading mechanism can be configured by moving the pressing unit formed integrally with the frame in association with the slider used to move the traverse unit acting as an existing component, the size of the disc device can be made compact.

In addition to the above mentioned, when a push switch is used to control the rotation of the motor, since a load applied to the push switch can be reduced by employing the structure for permitting the pressing unit to move in the press direction of the expansion/contraction portion that constitutes the push switch, the durability of the push switch can be improved.

BRIEF DESCRIPTION OF THE DRAWINGS

FIGS. 2A and 2B are views showing a tray simple body for transporting a disc in the embodiment of the invention, wherein

FIGS. 7A, 7B and 7C are views showing a slider simple body in the embodiment of the invention, wherein

FIGS. 9A, 9B and 9C are schematic views showing the relation between the pressing unit, a push switch, and the slider in the embodiment of the invention, wherein

FIGS. 10A and 10B are views at the time when the tray in the embodiment of the invention is located at the disc exchange position, wherein

FIGS. 11A and 11B are views showing the time when the user moves the tray slightly inward by pushing the tray with a finger from the state of FIGS. 10A and 10B, wherein

FIGS. 12A and 12B are views showing the state that the tray moves to a disc recording/playing-back position side by the power of the motor from the state of FIGS. 11A and 11B, and the slider starts the slide operation by the power of the motor, wherein FIGS. 13A and 13B are views showing the state that the slide operation of the slider from the state of FIGS. 12A and 12B has been completed and the disc can be recorded or play backed, wherein

DESCRIPTION OF THE PREFERRED EMBODIMENT

An embodiment as a best mode for carrying out the invention will be explained below using FIGS. 1 to 13B. Note that the invention can be easily applied to a configuration other than the configuration explained in the embodiment in a scope which is contrary to the gist of the invention.

Figure 1:
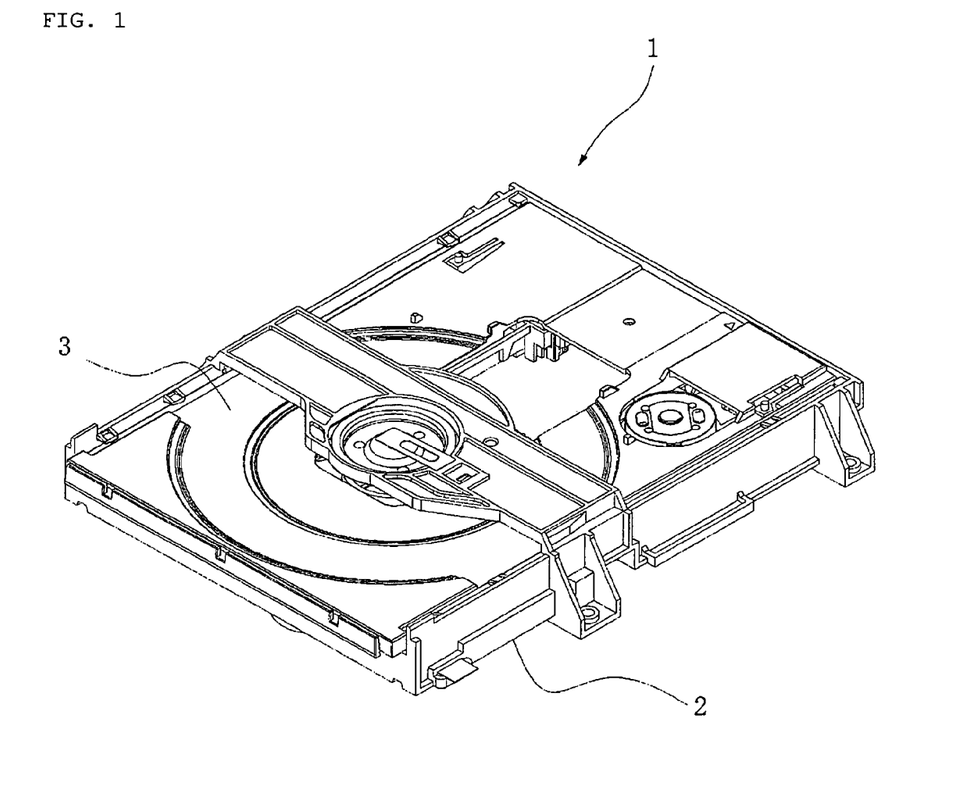
FIG. 1 is a flat side perspective view of a disc device in an embodiment of the invention.

FIG. 1 is a flat side perspective view of a disc device in an embodiment of the invention. In the figure, reference numeral 1 denotes a disc device, 2 denotes a frame acting as an exterior component of the disc device 1, 3 denotes a tray slidably assembled to the frame 2, respectively. That is, the disc device 1 shown in the embodiment of the invention includes the tray 3 which can be reciprocatingly moved as means for transporting the disc between a position outside of the device at which the disc can be exchanged by a hand of a user (hereinafter, simply called a disc exchange position) and a position inside of the device at which information can be recorded to a disc or information recorded to the disc can be played back (hereinafter, simply called a. disc recording/playing-back position).

Figure 2:
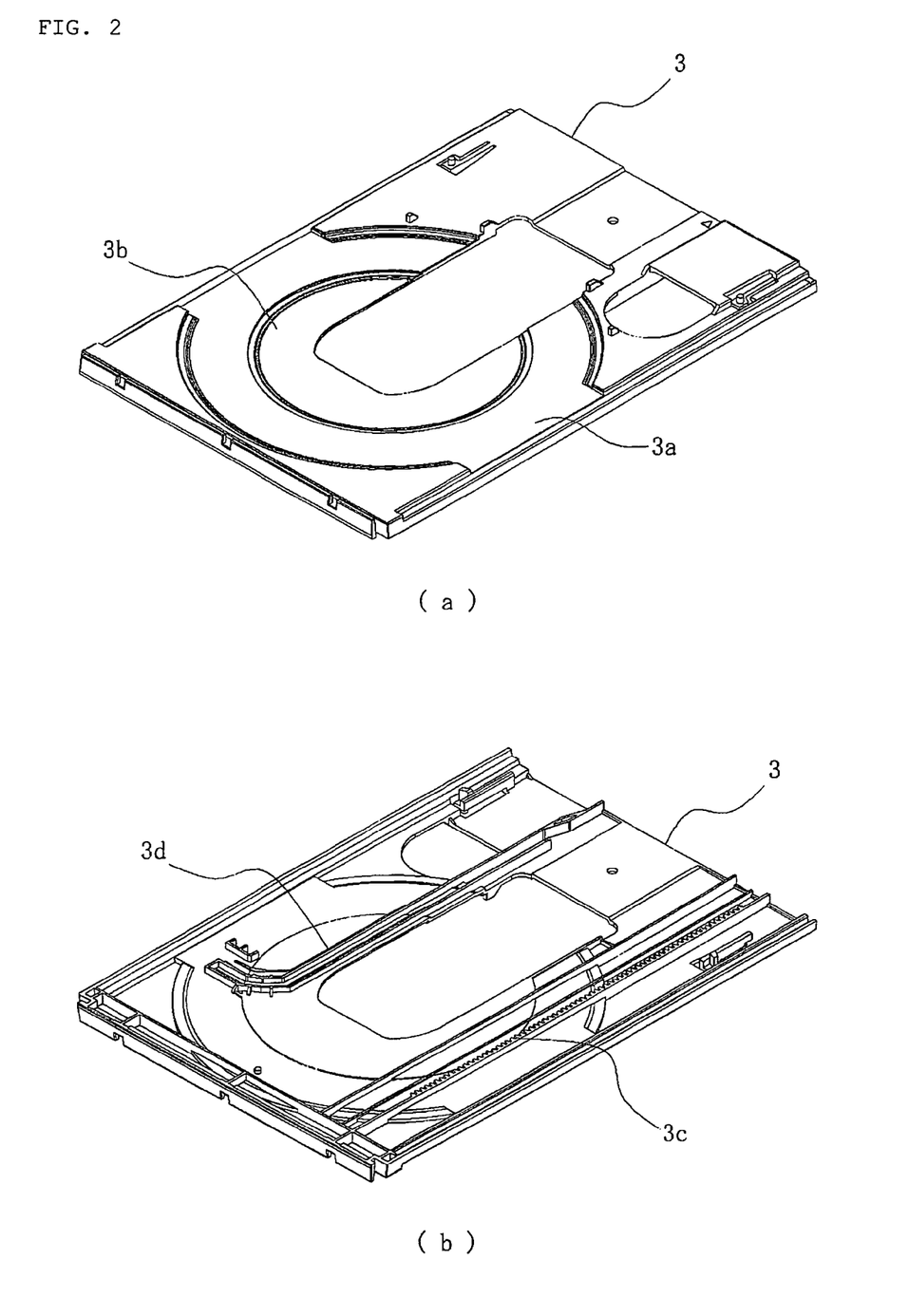
FIG. 2A is a flat side perspective view of the tray simple body.
FIG. 2B is a bottom surface side perspective view of the tray simple body.

FIGS. 2A and 2B are views showing a tray simple body for transporting the disc in the embodiment of the invention, wherein FIG. 2A is a flat side perspective view of the tray simple body, and FIG. 2B is a bottom surface side perspective view of the tray simple body. As shown in the figures, a concave large diameter disc placing surface 3a and a concave small diameter disc placing surface 3b are formed on the upper surface side of the tray 3 so that a large diameter disc having a diameter of 120 mm and a small diameter disc having a diameter of 80 mm can be placed on the disc placing surfaces 3a, 3b, respectively. That is, a disc can be placed at a predetermined position to the tray 3 by the large diameter disc placing surface 3a and the small diameter disc placing surface 3b. Further, a rack gear 3c is formed on the bottom surface side of the tray 3 to transmit the rotational force of a motor to be described later to the tray 3 via a power transmission mechanism. That is, the tray 3 can move between the disc exchange position and the disc recording/playing-back position by meshing a gear, which is rotated by the motor as a power source, with a rack gear 3c. An approximately L-shaped cam groove (hereinafter, simply called a tray cam groove) 3d is formed on the bottom surface side of the tray 3 independently the rack gear 3c. The disc device has such a structure that a slider projection, which is formed to a slider to be described later, is loosely fit into the tray cam groove 3d and associated with the slide operation of the tray 3 or the slider.

Figure 3:
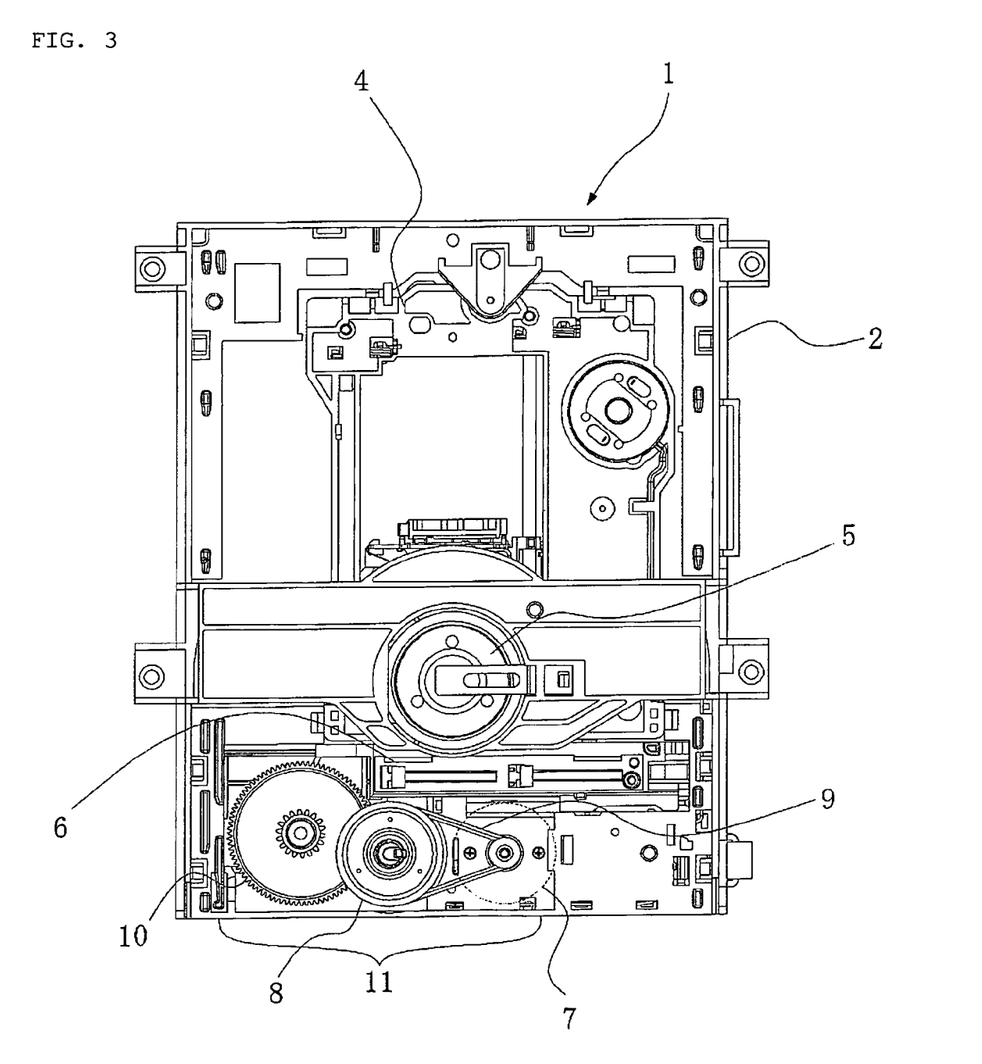
FIG. 3 is a plan view of the disc device in the embodiment of the invention from which the tray is removed.

FIG. 3 is a plan view of the disc device in the embodiment of the invention from which the tray is removed. In the figure, reference numeral 4 denotes a traverse unit which is assembled using a turntable for rotating a disc reached to the recording/playing-back position and a pickup unit for reading and playing back the information of disc or writing and recording information to the disc as main components, 5 denotes a clamper for clamping disc reached to the recording/playing-back position together with the turntable, 6 denotes the slider that slides in a direction orthogonal to the moving direction of the tray 3, 7 denotes the motor which can be rotated in forward and reverse directions, 8 denotes a pulley, 9 denotes a belt for transmitting the rotational force of the motor 7 to the pulley 8, 10 denotes a gear rotated in association with the pulley 8, 11 denotes the power transmission mechanism composed the pulley 8, the belt 9, and the gear 10. The disc device 1 shown in the figure has such a structure that a transport operation of the tray 3 and a tilt operation of the traverse unit 4 are performed by the rotational force of the motor 7. To describe the .transport operation of the tray 3 by the rotational force of the motor 7 in detail, the rotational force of the motor 7 is transmitted as the transport force of the tray 3 by meshing the gear 10, which configures the power transmission mechanism 11, with the rack gear 3c of the tray 3. Further, to describe the tilt operation of the traverse unit 4 performed by the rotational force of the motor 7, the slider 6 has such a structure that it is coupled with the traverse unit 4, and the rotational force of the motor 7 is transmitted as a sliding force of the slider 6 and converted to a tilt force of the traverse unit 4 by meshing the gear 10 with a gear formed to the slider 6.

Figure 4:
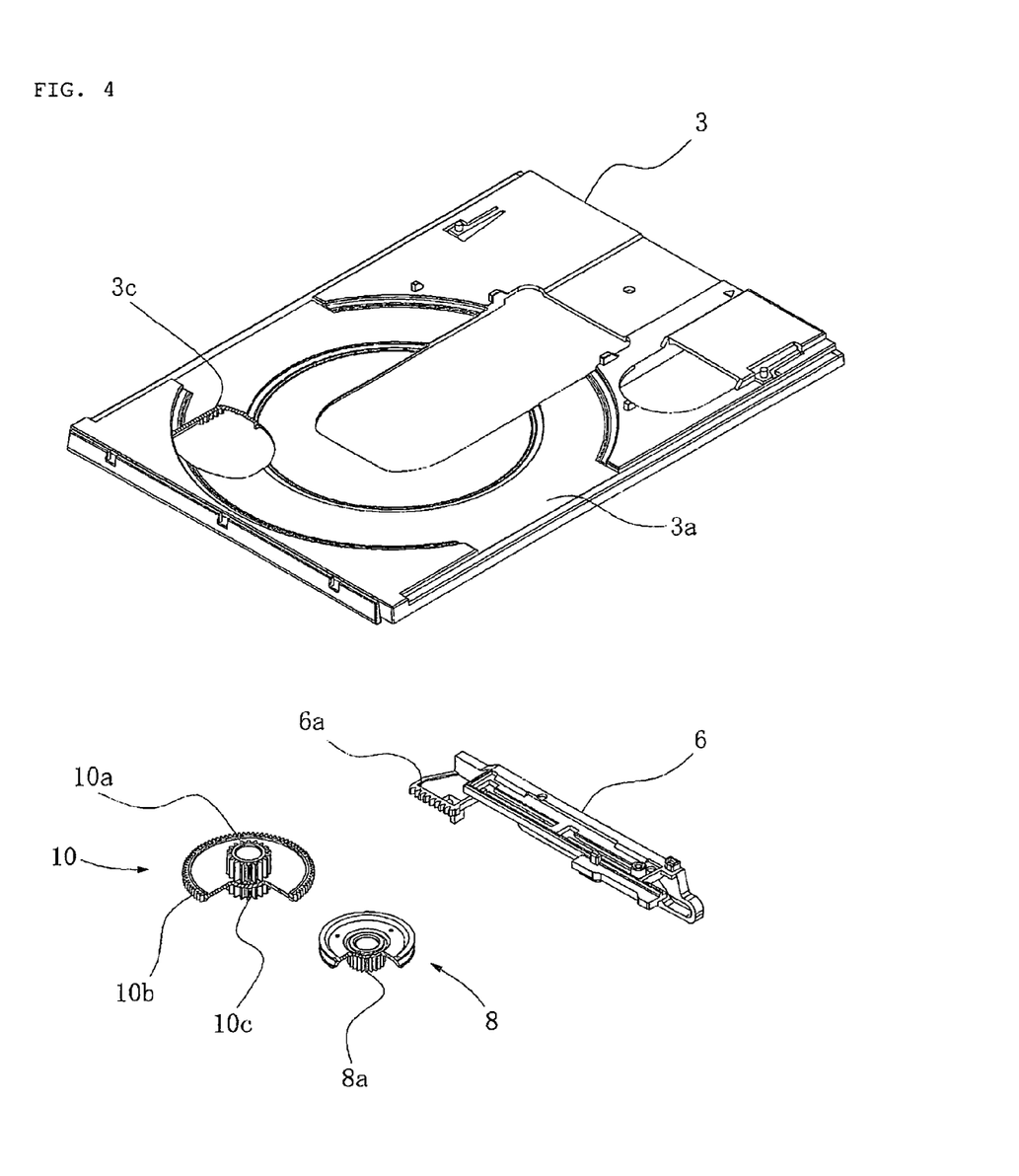
FIG. 4 is a flat side perspective view showing the relation between the tray, a slider, and a pulley and a gear that configure a power transmission mechanism in the embodiment of the invention.

Next, the relation between the gear 10 and peripheral components will be explained using FIG. 4. FIG. 4 is a flat side perspective view showing the relation between the tray, the slider, and the pulley and the gear that configure the power transmission mechanism in the embodiment of the invention. As shown in the figure, in the gear 10, an upper gear portion 10a, an intermediate gear portion 10b, and a lower gear portion 10c are formed integrally with each other. Since the pulley 8 is formed integrally with a pulley gear 8a and the pulley gear 8a is meshed with the intermediate gear portion 10b of the gear 10 at all times, the rotational force of the motor 7 is transmitted to the gear 10 at all times. Further, the rack gear 3c of the tray 3 is configured to be meshed with the upper gear portion 10a of the gear 10, and when the rack gear 3c is meshed with the upper gear portion 10a, the rotational force of the gear 10 that is rotated by the motor 7 is directly transmitted to the tray 3 and becomes the transport force by which the tray 3 is moved. Further, the slider 6 is formed integrally with a slider gear 6a, and the slider gear 6a can be meshed with the lower gear portion 10c of the gear 10. When the slider gear 6a is meshed with the lower gear portion 10c, the rotational force of the gear 10 that is rotated by the motor 7 is directly transmitted to the slider 6, becomes the sliding force of the slider 6, and is converted to the tilt force of the traverse unit 4 coupled with the slider 6.

Figure 5:
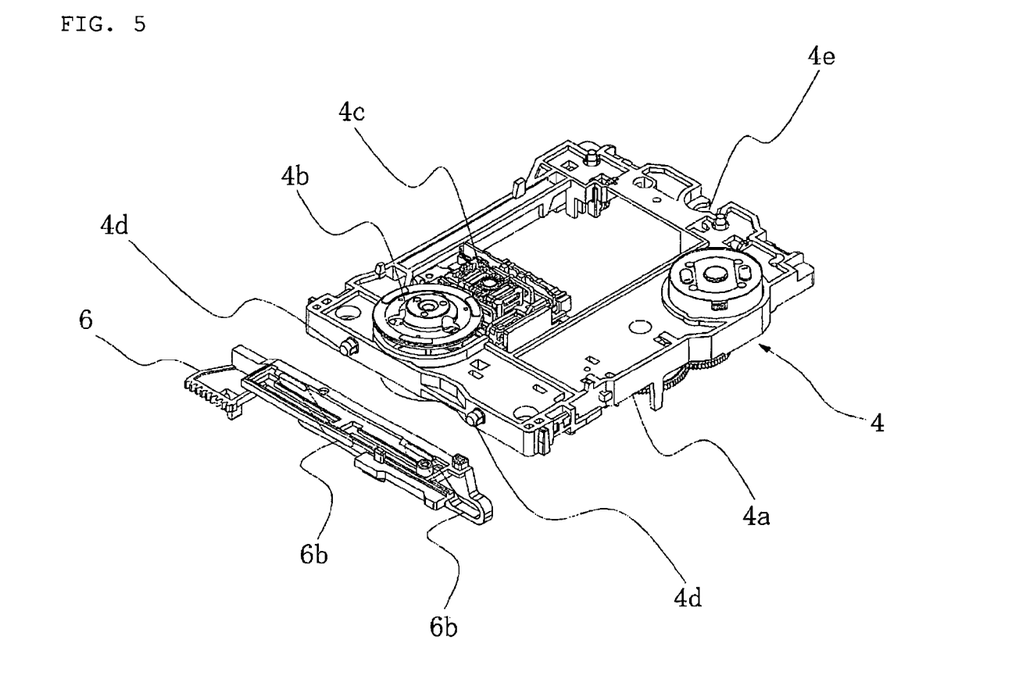
FIG. 5 is a flat side perspective view showing the relation between a traverse unit and a slider in the embodiment of the invention.

Next, the relation between the traverse unit 4 and the slider 6 will be explained using FIG. 5. FIG. 5 is a flat side perspective view showing the relation between the traverse unit and the slider in the embodiment of the invention. As shown in the figure, the traverse unit 4 is assembled to a base 4a using a turntable 4b and a pickup unit 4c as main components, and the base 4a is disposed with convex portions 4d, 4d projecting forward. A coupling portion 4e is disposed rearward of the base 4a and coupled with the frame 2 via a not shown damper, and the traverse unit 4 can tilt between a tilt state, in which the convex portions 4d, 4d side are located at a low position, and an approximately horizontal state, in which the convex portions 4d, 4d are located at a high position, using the coupling portion 4e as a fulcrum. In contrast, the slider 6 is formed with first cam grooves 6b, 6b into which the convex portions 4d, 4d of the traverse unit 4 are loosely fit, and the traverse unit 4 in the state that the convex portions 4d, 4d are loosely fit into the first cam grooves 6b, 6b tilt using a coupling portion 4e as the fulcrum in association with the slide operation of the slider 6. That is, the disc device 1 has such a structure that the convex portions 4d, 4d of the traverse unit 4, which are loosely fit into first cam grooves 6b, 6b formed to the slider 6, change their positions along the first cam grooves 6b, 6b in association with the slide operation of the slider 6, and the traverse unit 4 tilts using the coupling portion 4e as the fulcrum.

Figure 6:
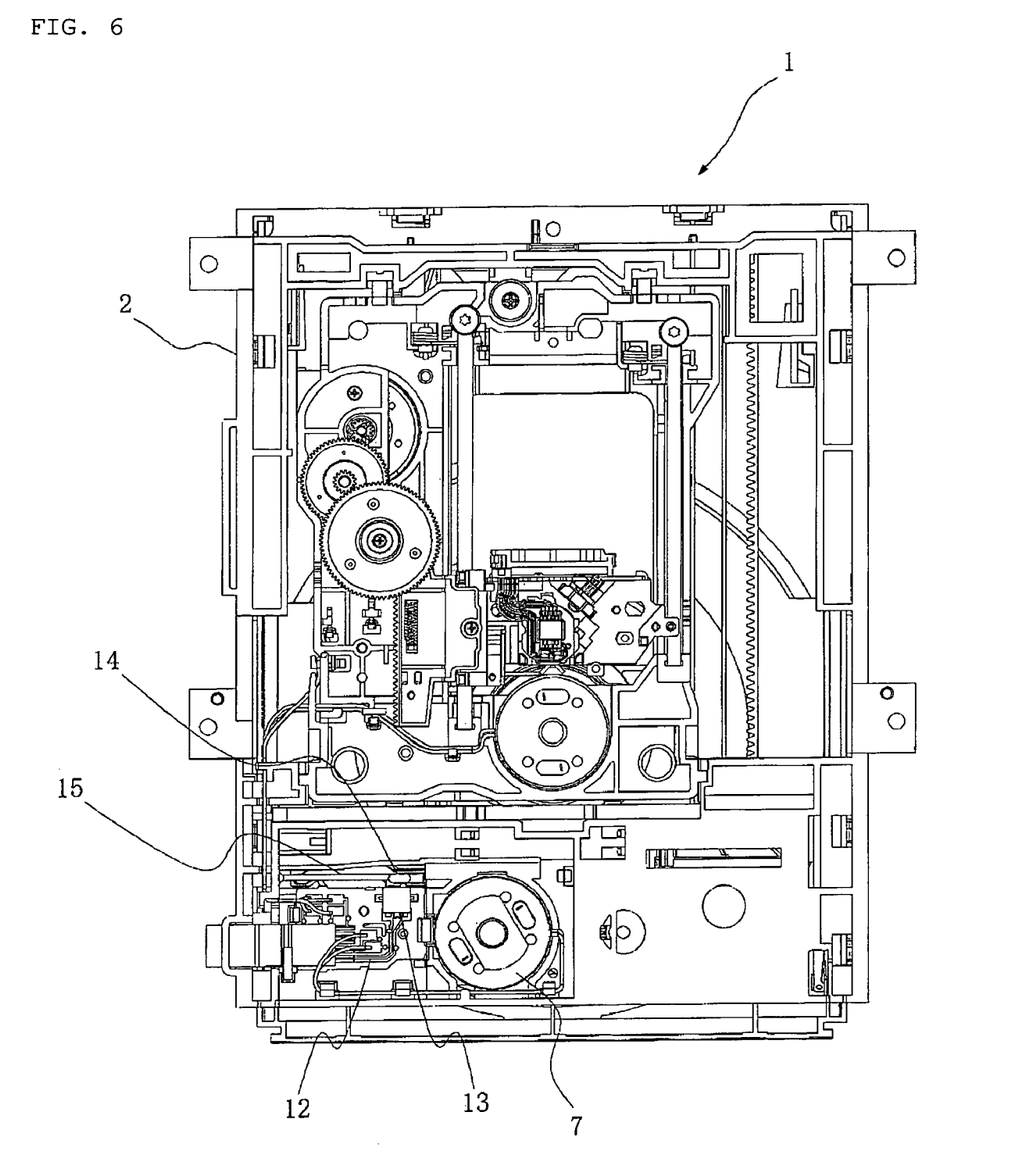
FIG. 6 is a bottom surface view of the disc device in the embodiment of the invention.

FIG. 6 is a bottom surface view of the disc device in the embodiment of the invention. In the figure, reference numeral 12 denotes a circuit board, 13 denotes a push switch disposed on the circuit board 12, 14 denotes a pressing unit for pressing the push switch 13, and 15 denotes a support portion formed integrally with the pressing unit 14. As shown in the figure, the pressing unit 14 and the support portion 15 are formed integrally with the frame 2 and the support portion 15 has flexibility. Then, the disc device has such a structure that the pressing unit 14 is caused to come into contact with and is separated from the push switch 13 disposed to the circuit board 12 making use of the flexibility of the support portion 15 so that the push switch 13 is turned on and off. Note that, in the embodiment, the slide operation of the slider 6 relates to the contact/separate operation of the pressing unit 14 to the push switch 13, which will be described in more detail using FIGS. 7A, 7B and 7C to FIGS. 9A, 9B, and 9C.

Figure 7:
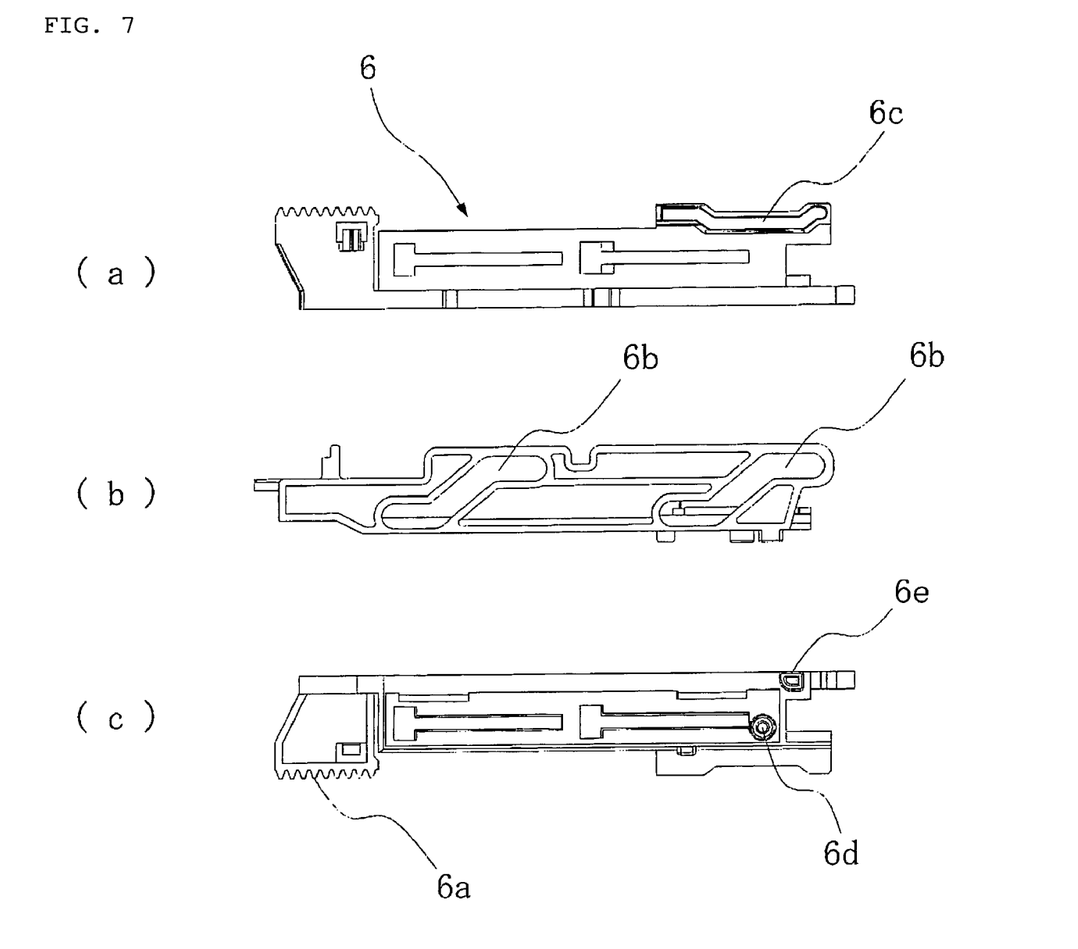
FIG. 7A is a bottom surface view of the slider simple body.
FIG. 7B is a back surface view of the slider simple body.
FIG. 7C is a plan view of the slider simple body.
Figure 8:
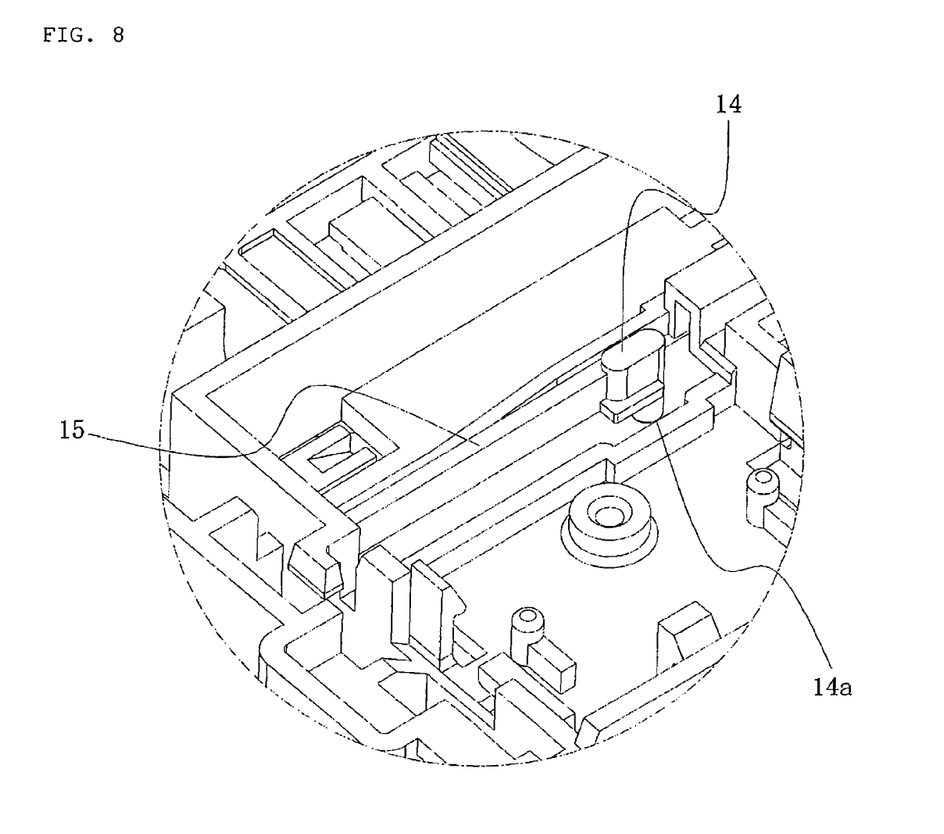
FIG. 8 is a bottom surface side partially enlarged perspective view of the vicinity of a pressing unit of the frame in the embodiment of the invention.
Figure 9:
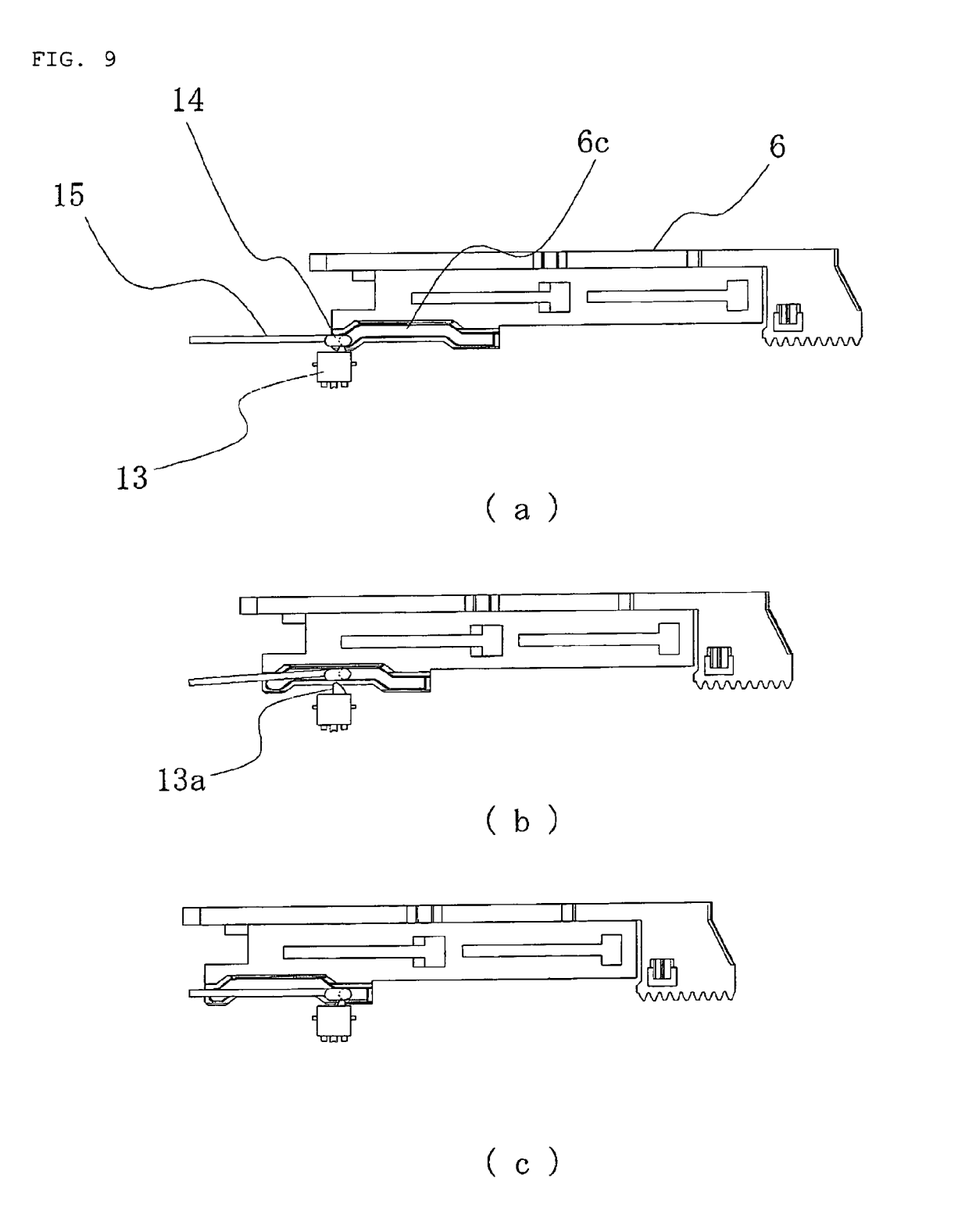
FIG. 9A is a bottom surface side schematic view showing the state that the tray has been taken out to a disc exchange position.
FIG. 9B is a bottom surface side schematic view showing the state that the slider is sliding from the state of FIG. 9A.
FIG. 9C is a bottom surface side schematic view showing the state that the slide operation of the slider has been completed and the tray is accommodated in the disc device.

FIGS. 7A, 7B and 7C are views showing the slider simple body in the embodiment of the invention, wherein FIG. 7A is a bottom surface view of the slider simple body, FIG. 7B is a back surface view of the slider simple body, and FIG. 7C is a plan view of the slider simple body. FIG. 8 is a bottom surface side partially enlarged perspective view of the vicinity of the pressing unit of the frame in the embodiment of the invention. FIGS. 9A, 9B and 9C are schematic views showing the relation between the pressing unit, the push switch, and the slider in the embodiment of the invention, wherein FIG. 9A is a bottom surface side schematic view showing the state that the tray has been taken out to the disc exchange position, FIG. 9B is a bottom surface side schematic view showing the state that the slider is sliding from the state of FIG. 9A, and FIG. 9C is a bottom surface side schematic view showing the state that the slide operation of the slider has been completed and the tray is accommodated in the disc device. As shown in the figures, the slider 6 is formed integrally with a second cam groove 6c, and the pressing unit 14 is formed with a pressing unit projection 14a loosely fit into the second cam groove 6c. That is, as the slider 6 slides, the pressing unit projection 14a moves along the second cam groove 6c, and the pressing unit 14 presses an expansion/contraction portion 13a of the push switch 13 from an expandable/contractible direction and turns on and off the push switch 13. Incidentally, it is considered, as another unit for pressing the push switch 13, to directly turn on and off the push switch 13 making use of the edge portion of the slider 6 which slides. However, in the case, since the push switch 13 is turned on and off orthogonally to the press direction of the expansion/contraction portion 13a, when a less expensive push switch 13 is employed, there is a possibility that since a load applied to the expansion/contraction portion 13a is increased, the life of the components is deteriorated and the components are broken. Thus, in the structure shown in the embodiment of the invention, since the push switch 13 can be pressed from the press direction of the expansion/contraction portion 13a without increasing the number of the components, the deterioration of the life of the components can be suppressed by the less expensive structure. Note that the slider 6 is formed with a first slider convex portion 6d, which is loosely fit into the tray cam groove 3d formed on the bottom surface side of the tray 3 described above, and a second slider convex portion 6e which is positioned outside of the side wall of the tray cam groove 3d. The first slider convex portion 6d and the second slider convex portion 6e are necessary to switch the meshed state between the upper gear portion 10a of the gear 10 and the rack gear 3c or the meshed state between the lower gear portion 10c of the gear 10 and the slider gear 6a.

Although the structure in the embodiment of the invention is described above, next, a specific operation of the disc device shown in the embodiment of the invention will be explained using FIGS. 10A to 13B.

FIGS. 10A and 10B are views at the time when the tray in the embodiment of the invention is located at the disc exchange position, wherein FIG. 10A is a flat surface side partially perspective view of the disc device, and FIG. 10B is a bottom surface side partially enlarged view showing the vicinity of the push switch of the disc device. Note that, to make the internal state of the disc device 1 definite, in the figures, the flat surface side of the tray 3 is shown by broken lines. As shown in the figures, when the tray 3 is located at the disc exchange position, the user can place the large diameter disc or the small diameter disc or can exchange the discs along the large diameter disc placing surface 3a or the small diameter disc placing surface 3b formed on the upper surface side of the tray 3. Further, in the state shown in the figures, the traverse unit 4 tilts using the coupling portion 4e as the fulcrum, and further the expansion/contraction portion 13a of the push switch 13 disposed to the circuit board 12 is pressed by the pressing unit 14. Note that, in the embodiment, the motor 7 stops in the state of the figures and is controlled so as to rotate by separating the pressing unit 14 from the expansion/contraction portion 13a of the push switch 13.

Figure 10:
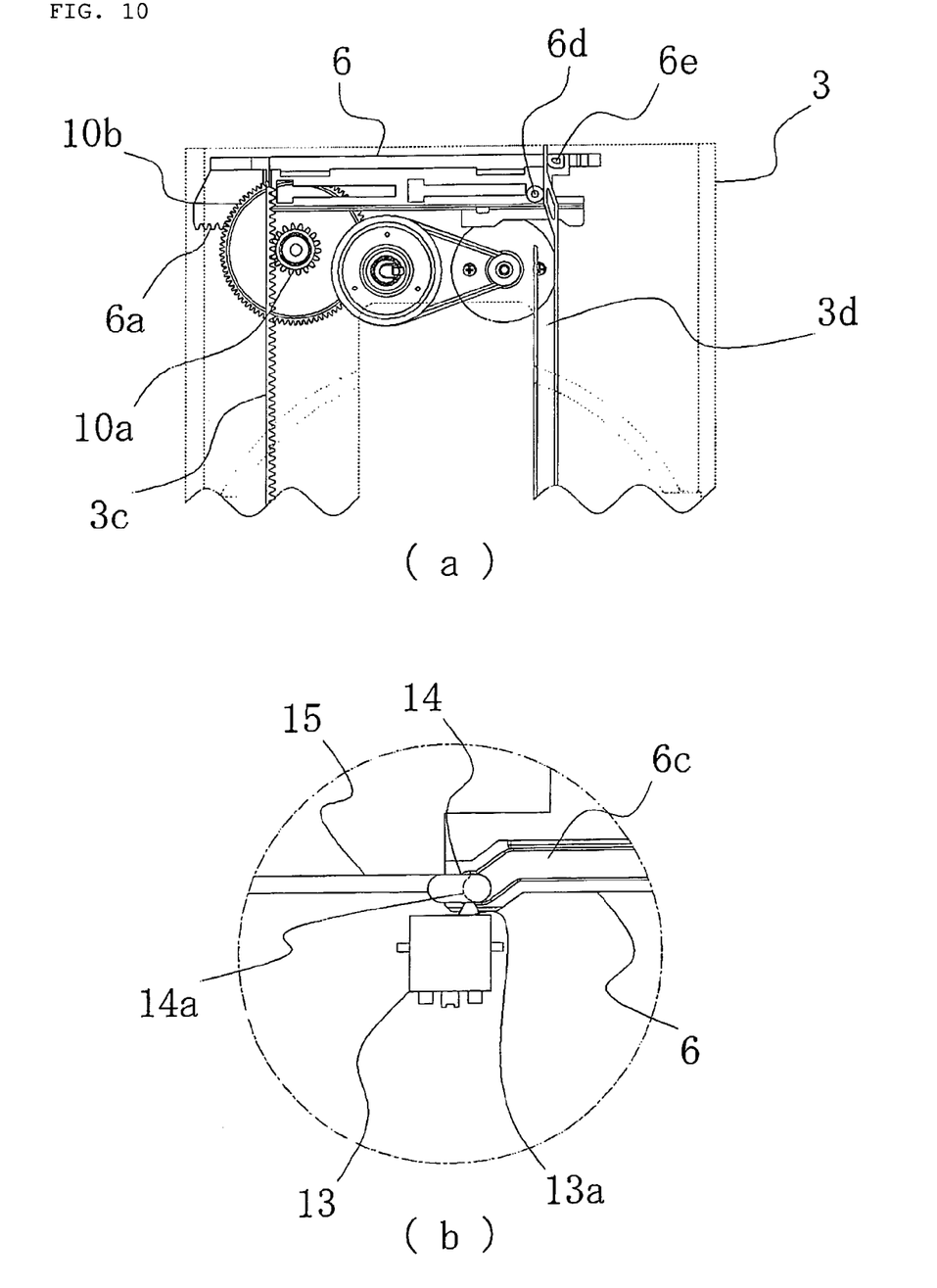
FIG. 10A is a flat surface side partially perspective view of the disc device.
FIG. 10B is a bottom surface side partially enlarged view showing the vicinity of the push switch of the disc device.
Figure 11:
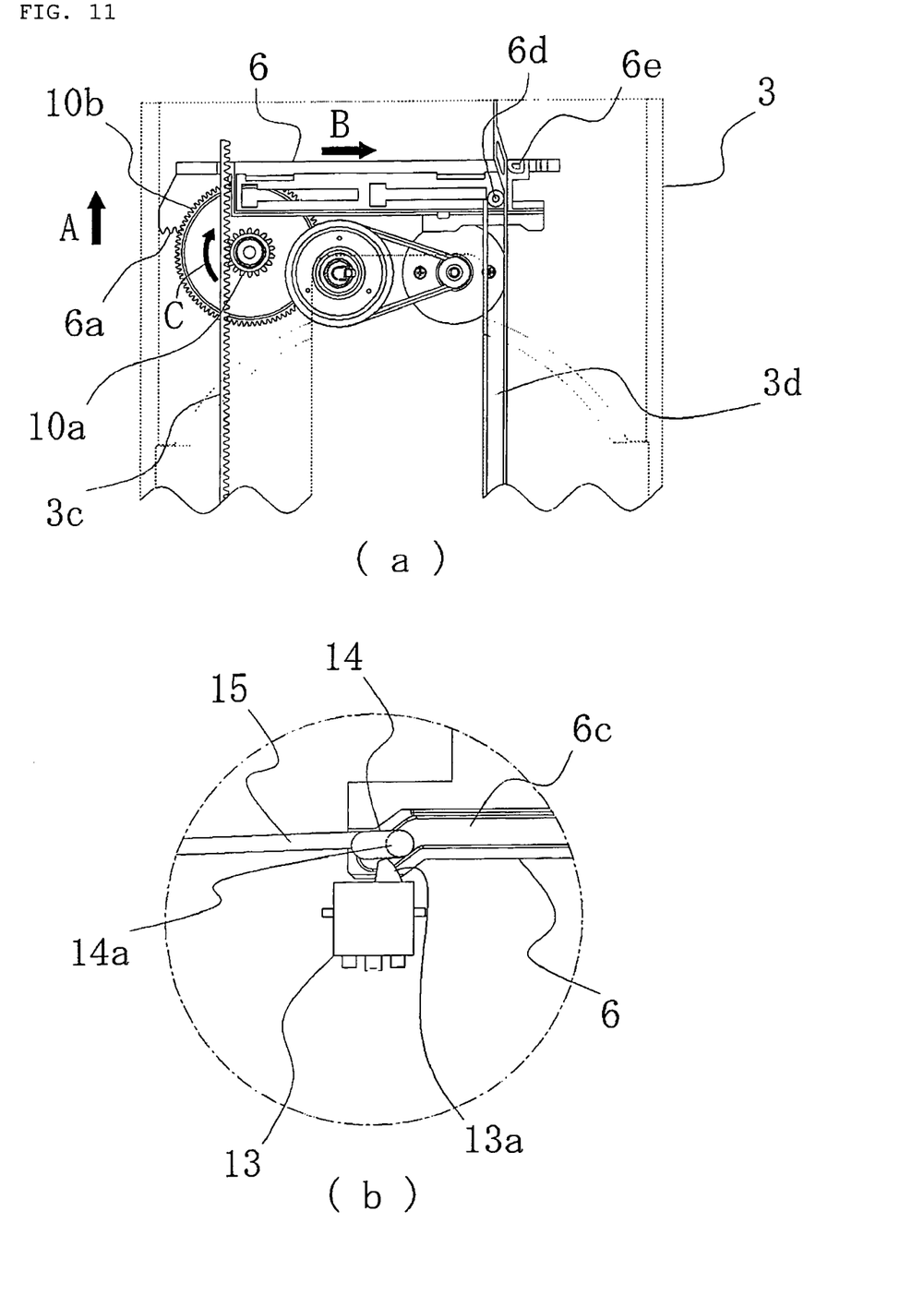
FIG. 11A is a flat surface side partially perspective view of the disc device.
FIG. 11B is a bottom surface side partially enlarged view showing the vicinity of the push switch of the disc device.
Figure 12:
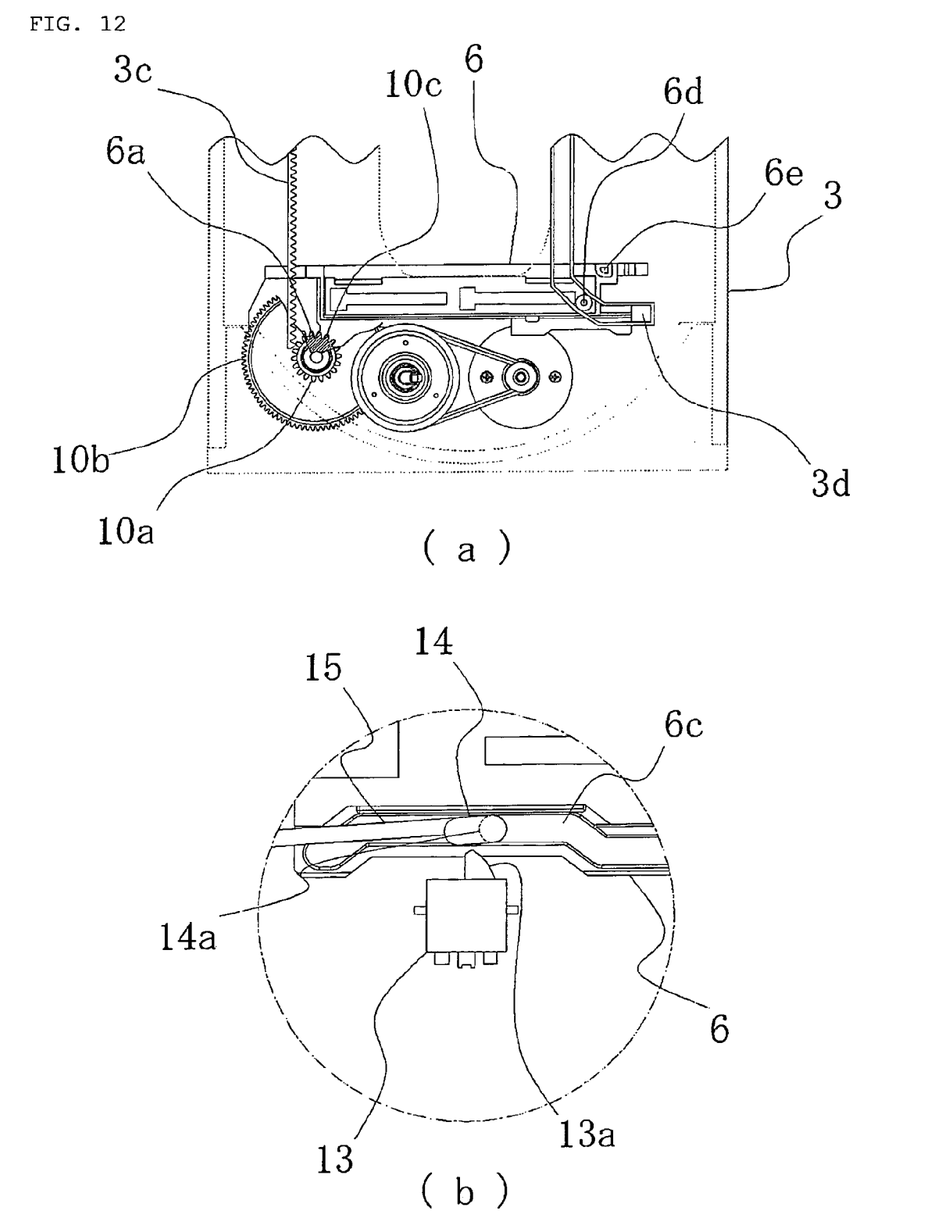
FIG. 12A is a flat surface side partially perspective view of the disc device.
FIG. 12B is a bottom surface side partially enlarged view showing the vicinity of the push switch of the disc device.
Figure 13:
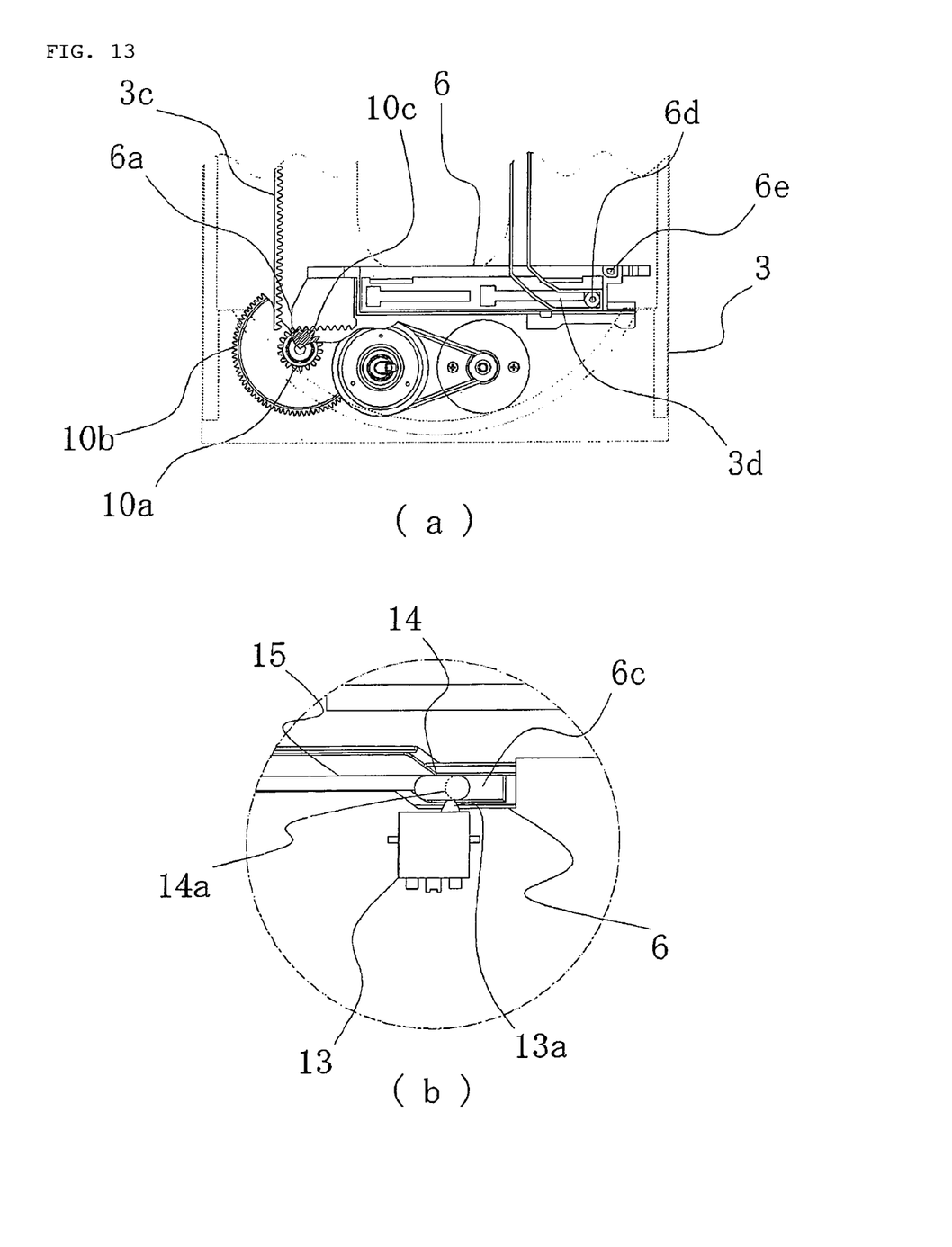
FIG. 13A is a flat surface side partially perspective view of the disc device.
FIG. 13B is a bottom surface side partially enlarged view showing the vicinity of the push switch of the disc device.

FIGS. 11A and 11B are views showing the time when the user moves the tray slightly inward by pushing the tray with a finger from the state of FIGS. 10A and 10B, wherein FIG. 11A is a flat surface side partially perspective view of the disc device, and FIG. 11B is a bottom surface side partially enlarged view showing the vicinity of the push switch of the disc device. Note that the flat surface side of the tray 3 is shown by broken lines likewise FIG. 10. As shown in the figures, when the user slightly presses the leading end of the tray 3 located at the disc exchange position with a finger in the direction of an arrow A, the slider 6 is slightly moved by the first slider convex portion 6d and the second slider convex portion 6e in the direction of an arrow B along the tray cam groove 3d of the tray 3, and as the slider 6 moves, the pressing unit projection 14a moves along the second cam groove 6c. As a result, the pressing unit 14, which presses the expansion/contraction portion 13a of the push switch 13, is separated from the expansion/contraction portion 13a and the motor 7 begins to rotate in the direction of an arrow C, and as the motor 7 rotates, the gear 10 begins to rotate in the direction where the tray 3 is pulled to a disc recording/playing-back position. At the time, the rack gear 3c of the tray 3 is meshed with the upper gear portion 10a of the gear 10, and the slider gear 6a of the slider 6 is separated from the lower gear portion 10c of the gear 10. Accordingly, only the tray 3 is slid by the rotation of the gear 10.

FIGS. 12A and 12B are views showing the state that the tray is moved to the disc recording/playing-back position side by the power of the motor from the state of FIGS. 11A and 11B and the slider starts the slide operation by the power of the motor, wherein FIG. 12A is a flat surface side partially perspective view of the disc device, and FIG. 12B is a bottom surface side partially enlarged view showing the vicinity of the push switch of the disc device. Note that, likewise FIGS. 10A and 10B and FIGS. 11A and 11B, the flat surface side of the tray 3 is shown by broken lines, and further the gear 10 is partially cut out to make the mesh state between the slider gear 6a and the lower gear portion 10c definite. As shown in the figures, just before the tray 3 reaches from the disc exchange position to the disc recording/playing-back position, the first slider convex portion 6d and the second slider convex portion 6e of the slider 6 slightly moves along the tray cam groove 3d of the tray 3, and the slider gear 6a of the slider 6 is meshed with the lower gear portion 10c of the gear 10. As a result, the slider 6 begins to slide by the rotation of the gear 10. In contrast, the rack gear 3c of the tray 3 is separated from the upper gear portion 10a of the gear 10 by the slide operation of the slider 6. Specifically, since the first slider convex portion 6d of the slider 6, which is slid by the rotation of the gear 10, presses the tray cam groove 3d of the tray 3 formed in an approximately L-shape, the tray 3 slightly moves to the disc recording/playing-back position side, and the rack gear 3c is separated from the upper gear portion 10a of the gear 10. As a result, the rotational force of the motor 7 is transmitted only to the slider 6, and only the slider 6 slides. Note that the pressing unit 14 remains separated from the expansion/contraction portion 13a of the push switch 13.

FIGS. 13A and 13B are views showing the state that the slide operation of the slider from the state of FIGS. 12A and 12B has been completed and the disc can be recorded or play backed, wherein FIG. 13A is a flat surface side partially perspective view of the disc device, and FIG. 13B is a bottom surface side partially enlarged view showing the vicinity of the push switch of the disc device. Note that, likewise FIGS. 12A and 12B, the flat surface side of the tray 3 is shown by broken lines, and the gear 10 is partially cut out. As the slider 6 slides, the convex portions 4d, 4d of the traverse unit 4, which are loosely fit into the first cam grooves 6b, 6b, move from the low position to the high position along the first cam grooves 6b, 6b, the traverse unit 4 tilts using the coupling portion 4e as the fulcrum so as to shift from the tilt state to the approximately horizontal state, the disc, which is placed on the large diameter disc placing surface 3a or the small diameter disc placing surface 3b of the tray 3, is lifted upward from the tray 3 by the turntable 4b as a main component of the traverse unit 4, and the disc is clamped by the turntable 4b and the clamper 5 disposed at a position confronting the turntable 4b. When the slider 6 slides up to the position shown in the figures, the pressing unit 14 presses the expansion/contraction portion 13a of the push switch 13 as the pressing unit projection 14a, which is loosely fit into the second cam groove 6c of the slider 6, moves, and the motor 7 stops its rotation. The turntable 4b begins rotation from the state, the disc and the clamper 5 also rotate together with the turntable 4b, and information is read from or written to the disc in rotation by the pickup unit 4c.

The specific operation of the disc device shown in the embodiment of the invention has been explained from the time at which the user slightly moves the tray 3 at the disc exchange position inward by pushing the tray 3 with a finger to the time at which the tray 3 reaches the disc recording/playing-back position and is placed in the state in which recording and playing-back of the disc becomes possible. However, as another operation, a case is considered in which a carrying-in operation is performed without pressing the tray 3 at the disc exchange position with a finger of the user. That is, this is the case in which, in an electronic equipment accommodated with the disc device 1 shown in the embodiment of the invention, the user presses an operation button, which carries the tray 3 from the disc exchange position to the disc recording/playing-back position, in the operation buttons provided with the electronic equipment. In the case, the motor 7 rotates by pressing the operation button, and subsequent operations are the same as the operations described above. As still another operation, although an operation, in which the tray 3 moves from the disc recording/playing-back position to the disc exchange position, is considered, the operation is opposite to the above operation. That is, when the user presses an operation button, which carries the tray 3 from the disc recording/playing-back position to the disc exchange position in the operation buttons provided with the electronic equipment accommodated with the disc device 1 shown in the embodiment of the invention, the motor 7 begins to rotate in a direction opposite to the above direction and the slide operations of the slider 6 and the tray 3 are performed in an order opposite to the above order.

While the embodiment of the invention has been described above in detail, the invention is not limited to the embodiment and can be variously modified within the scope of the gist of the invention. For example, in the embodiment of the invention, the structure, in which the motor rotates when the pressing unit is separated from the expansion/contraction portion of the push switch, has been explained. However, a structure, in which the motor rotates when the expansion/contraction portion of the push switch is pressed by the pressing unit, may be employed. Further, in the embodiment of the invention, the case, in which the relatively less expensive push switch is used, has been explained. However, the shape and the configuration of other components including the switch can be appropriately selected within the scope which does not depart from the leading feature of the invention that the pressing unit for pressing the switch is formed integrally with the frame acting as the exterior component of the disc device. In addition to the above mentioned, the invention can be applied also to, for example, a slot-in system disc device, which permits to directly insert and extract a disc, and the like in addition to the disc device provided with the tray shown in the embodiment of the invention.

What is claimed is:

1. A disc device comprising a disc loading mechanism, the disc device comprising:
   a frame acting as an exterior component;
   a power source for transporting a disc;

a switch for controlling the start or the stop of the power source by switching on or off;

a pressing unit for turning on and off the switch;

a slidable slider; and a traverse unit which tilts in association with a slide operation of the slider, wherein:

the power source, the switch, the slider, and the traverse unit are disposed to the frame;

the pressing unit is formed integrally with the frame;

the slider is formed with a cam groove for moving the pressing unit;

the pressing unit is formed with a pressing unit projection loosely fit into the cam groove; and the pressing unit can move in a direction where the pressing unit is pressed to and separated from the switch in association with the slide operation of the slider.

2. The disc device according to claim 1, wherein the switch is a push switch comprising an expansion/contraction portion which can move in an axis direction, and the pressing unit can move in the press direction of the expansion/contraction portion.

* * * * *